(12) United States Patent
Son et al.

(10) Patent No.: US 10,034,581 B2
(45) Date of Patent: Jul. 31, 2018

(54) DUAL CONTENT MIXING CONTAINER

(71) Applicant: YONWOO CO., LTD., Incheon (KR)

(72) Inventors: Su-Jin Son, Incheon (KR); Ki-Young Ham, Incheon (KR); You-Seob Kim, Incheon (KR)

(73) Assignee: YONWOO CO., LTD., Incheon (KR)

( * ) Notice: Subject to any disclaimer, the term of this patent is extended or adjusted under 35 U.S.C. 154(b) by 262 days.

(21) Appl. No.: 14/761,217

(22) PCT Filed: Jan. 6, 2014

(86) PCT No.: PCT/KR2014/000076
§ 371 (c)(1),
(2) Date: Jul. 15, 2015

(87) PCT Pub. No.: WO2014/112737
PCT Pub. Date: Jul. 24, 2014

(65) Prior Publication Data
US 2015/0342411 A1 Dec. 3, 2015

(30) Foreign Application Priority Data
Jan. 15, 2013 (KR) .......... 10-2013-0004245

(51) Int. Cl.
*A47J 43/27* (2006.01)
*B05B 11/00* (2006.01)

(52) U.S. Cl.
CPC .......... *A47J 43/27* (2013.01); *B05B 11/0081* (2013.01); *B05B 11/0048* (2013.01); *B05B 11/3023* (2013.01); *B05B 11/3047* (2013.01); *B05B 11/3069* (2013.01); *B05B 11/3074* (2013.01)

(58) Field of Classification Search
CPC .......... B05B 11/0048; B05B 11/0081; B65D 81/3211; B65D 51/2857

USPC .................. 366/130; 222/548; 206/219, 221
See application file for complete search history.

(56) References Cited

U.S. PATENT DOCUMENTS

| | | | | |
|---|---|---|---|---|
| 5,992,693 | A * | 11/1999 | Albisetti | B65D 81/3211 206/221 |
| 6,435,231 | B1 * | 8/2002 | Cooper | B65D 81/3211 141/107 |
| 7,367,709 | B2 * | 5/2008 | Ki | B05B 11/0081 206/221 |

FOREIGN PATENT DOCUMENTS

| | | |
|---|---|---|
| JP | 2009-057084 A | 3/2009 |
| KR | 20-0336105 Y1 | 12/2003 |
| KR | 2013-0000273 A | 1/2013 |

OTHER PUBLICATIONS

International Search Report issued in Application No. PCT/KR2014/000076 dated Mar. 21, 2014.

\* cited by examiner

*Primary Examiner* — Tony G Soohoo
*Assistant Examiner* — Elizabeth Insler
(74) *Attorney, Agent, or Firm* — Marshall, Gerstein & Borun LLP

(57) ABSTRACT

The present invention relates to a dual content mixing container, and the dual content mixing container according to the present invention is constituted in such a way that a second content substance housed in a storage chamber is mixed with a first content substance housed in a main container body by moving a hermetically sealing member downwards by means of action whereby a rotating cap is rotated, and thus the invention affords convenience to the user as the first and second content substances can be mixed by means of a simple action.

1 Claim, 6 Drawing Sheets

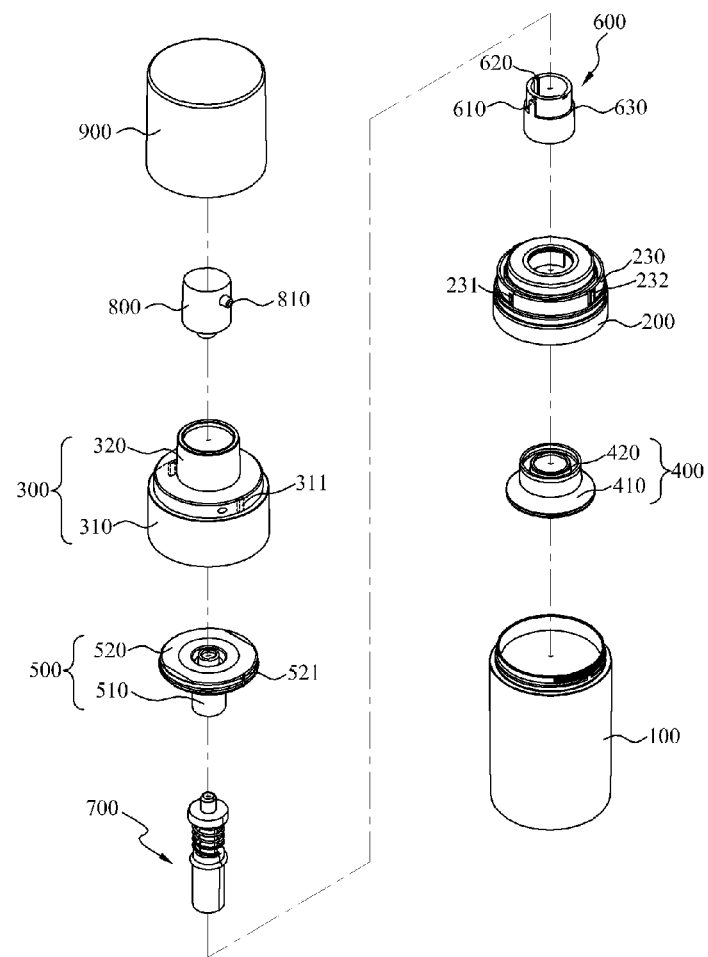
[Fig. 1]

[Fig. 2]
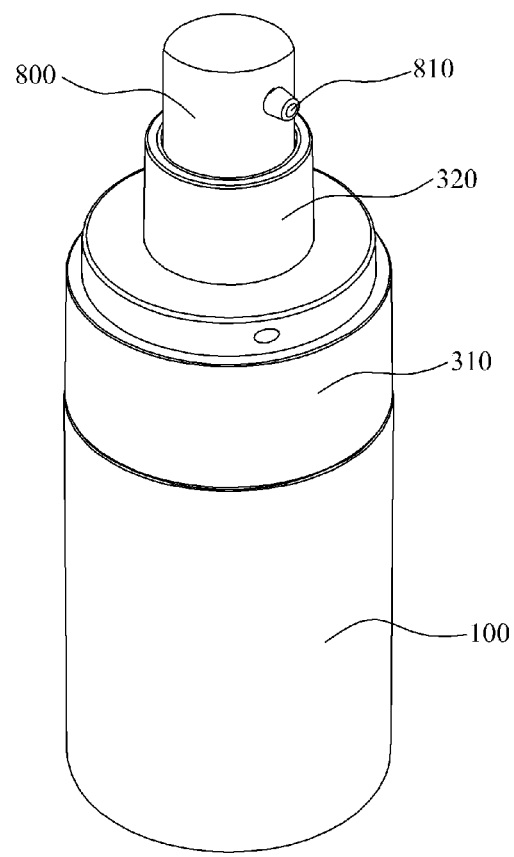

[Fig. 3]
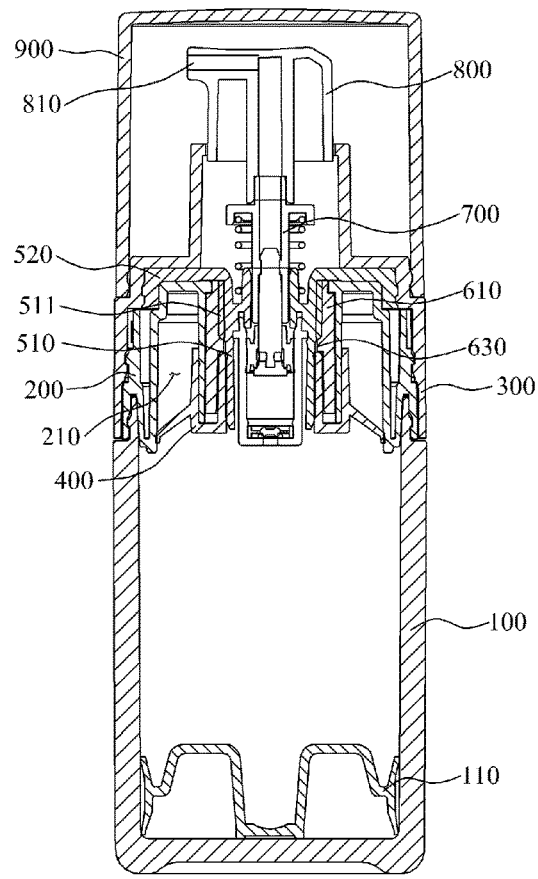
[Fig. 4]
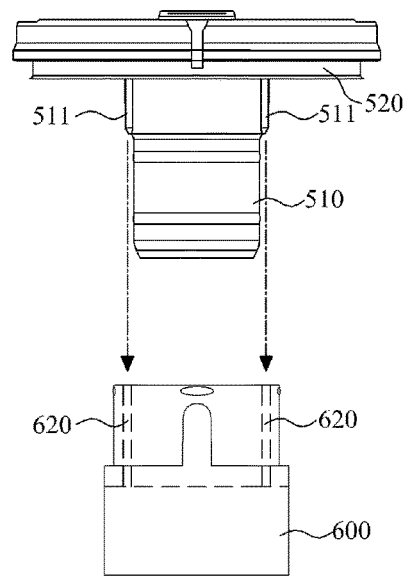

[Fig. 5]
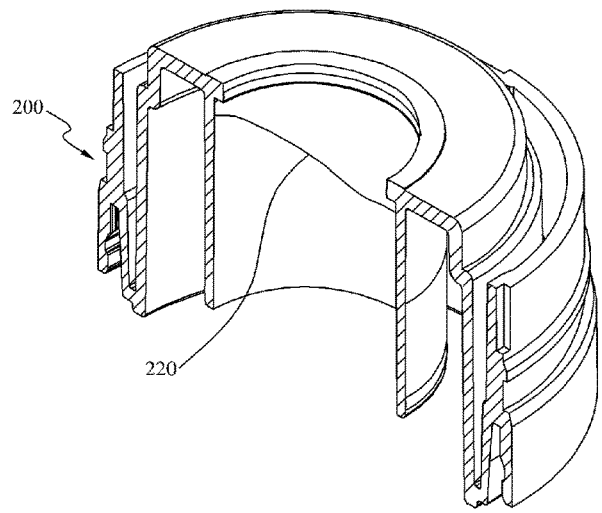
[Fig. 6]
(a)
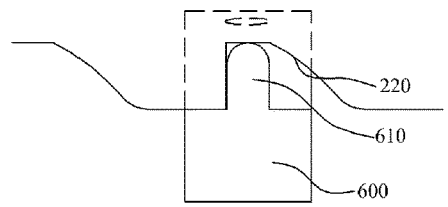
(b)
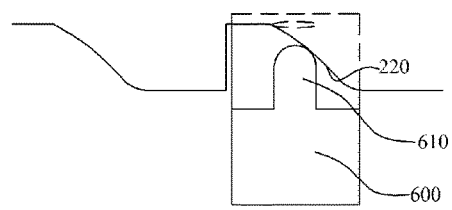
(c)
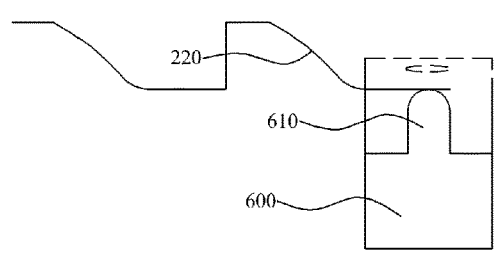

[Fig. 7]
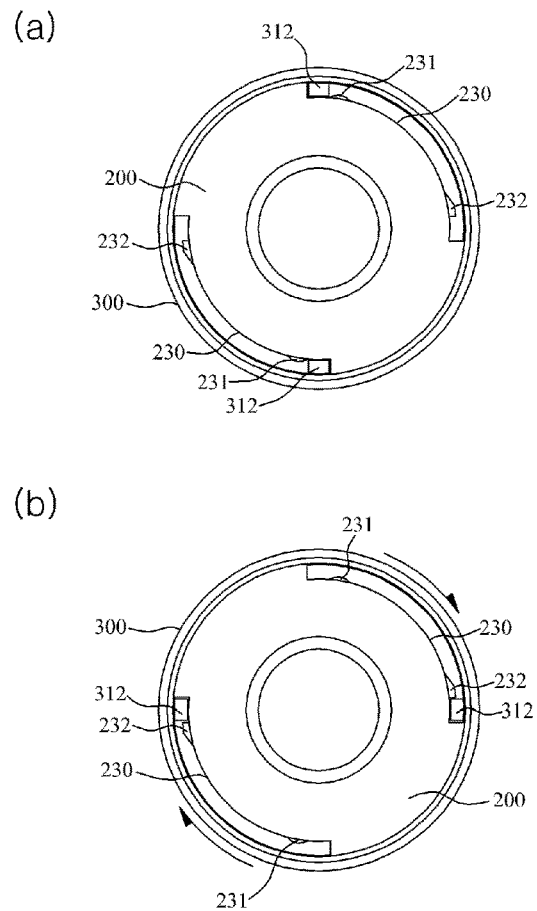
[Fig. 8]
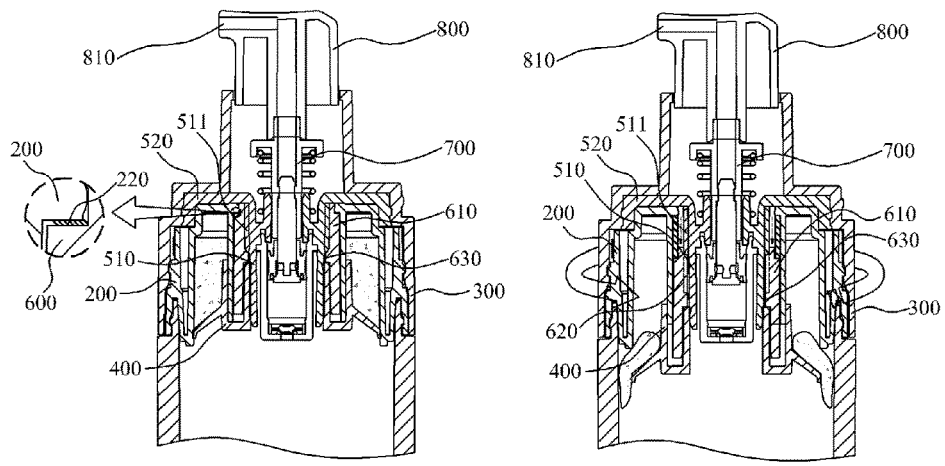

[Fig. 9]
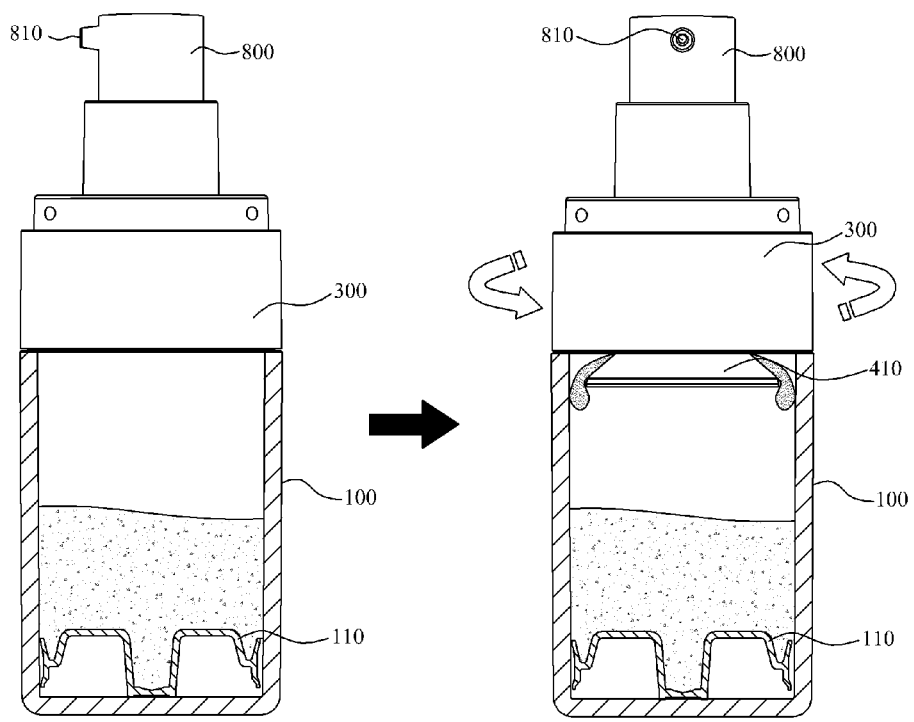

DUAL CONTENT MIXING CONTAINER

CROSS REFERENCE TO RELATED APPLICATIONS

This U.S. non-provisional patent application is a national stage application under 35 U.S.C. § 371 of international application PCT/KR2014/000076, filed Jan. 6, 2014, and claims the benefit of priority under 35 U.S.C. § 119 of Korean Patent Application No. 10-2013-0004245, filed Jan. 15, 2013, the entire contents of which are hereby incorporated herein by reference for all purposes.

TECHNOLOGICAL FIELD

This disclosure relates to a dual content mixing container, and the dual content mixing container is constituted in such a way that a second content substance housed in a storage chamber is mixed with a first content substance housed in a main container body by moving a hermetically sealing member downwards by means of action whereby a rotating cap is rotated, and thus the invention affords convenience to the user as the first and second content substances can be mixed by means of a simple action.

BACKGROUND

Generally, a container used or in circulation is mostly made to keep contents of one kind in one container to be used.

Recently, in order to improve property of contents, there have been some cases where powdered material is mixed into fluid contents or two-types of contents are mixed and used. In these cases, since additional containers are needed to keep two types of contents, a user should carry and handle two containers to use these contents, thereby leading to inconvenience.

Additionally, by manufacturing different containers and packaging different contents into separate containers, not only may problems such as a waste of resources be caused. A chemical change such as taste quality change or spoilage may also be caused because a user have no choice but to mix beverages arbitrarily not putatively, thereby resulting in incomplete mixing, as may be a physical change like incomplete dissolution of efficacy when mixing medicines and chemical materials.

To solve such problems described above, various kinds of containers, wherein two-type contents are kept into one container separately and then used by mixing the two-type contents, are being developed.

Hereinafter, Korean Patent Registration No. 10-1192603, "Cosmetic vessel having mixed two-type materials" filed and owned by the present applicant is to be described.

The above registered patent is provided a mixing container for different contents, comprising a housing having a storing compartment storing contents, a piston being installed in the interior of the storing compartment; a guide bracket which is engaged to the top of the housing, an engaging shoulder protruding toward the inner side of the storing compartment, a guide piece formed at the top of the guide bracket and extending upward; a button part operating as it is inserted in the guide piece and having a pumping member for the contents to discharge through a discharge port by a user's work; a sealing ring which is installed to selectively part between the guide bracket and the button part; and a storing container comprising a receiver member which is installed at the button part and contains contents which is different from the contents stored in the storing compartment, the lower side of the receiver member being supported by the engaging shoulder; and a sealing member which selectively seals the lower side of the receiver member and is engaged to the lower side of the pumping member and has a communication hole allowing the pumping member and the storing compartment to communicate during the pumping of the pumping member.

The above registered patent has a composition, wherein a sealing member moves downwards by a pumping member when a button member is pressed downwards after a sealing seal is removed, and thereby opens lower end of a receiver member; as a result, contents kept inside of the receiving member flows into a storing compartment, leading to mixing two-type materials.

However, the above registered patent has a problem wherein the residue remaining in the sealing ring when the sealing ring is removed, which does not look good in external appearance. Also, only when a button part is pressed downwards after the sealing ring is removed, a sealing member moves downwards and makes two-type materials mixed, which leads to user inconvenience.

SUMMARY OF THE DISCLOSURE

The presently described embodiments are devised to solve the said problems above, the goal being to provide dual content mixing container, which has a composition wherein a sealing member moves downwards by the operation of rotating a rotation cap and second contents kept in a storage chamber mixes with a first content substance kept in a main container body, so that by a simple manipulation it is possible for two-type contents to be mixed, leading to user convenience.

To solve the above problems, dual content mixing container according to the present disclosure comprises a main container body in which a first content substance is kept; an inner cap which is combined as encircling a upper part of the main container body, wherein a which forms space for storing second contents is equipped, and wherein a pair of sloped portions corresponding each other is formed as encircling the inner circumferential surface; a rotation cap which is coupled to be able to rotate as encircling the inner cap on upper portion of the main container body; a sealing member which closes an end of a storage chamber of the main container body, and descends by rotation of the rotation cap; a pump support body which is formed to be interlocked inside the rotation cap and rotated with rotation of the rotation cap, comprising a pump combining tube where a pumping member is coupled and a securing plate which is coupled as encircling the pump combining tube and is secured on the inner cap; a pressurizing member combined to upper portion of the sealing member is rotated being interlocked with the pump support body, wherein with a pair of descending guide protrusions equipped on upper portion of the pair of sloped portions, the pressurizing member moves along the sloped portions by rotation, lowering the sealing member; a pumping member which is coupled to the pump support body and discharges contents by pumping operation; and a button member which is coupled to upper portion of the pumping member and makes the pumping member operate, wherein a discharging hole is formed for contents to be discharged.

Furthermore, it is featured that a coupling groove is equipped on an outer circumferential surface of the pump support body in order for the rotation cap to be interlocked, and that a coupling protrusion combined to the coupling groove is equipped on an inner circumferential surface of the rotation cap.

Furthermore, it is featured that a pair of rotation limiting protrusions corresponding each other are equipped on an outer circumferential surface to limit the range of rotation of the rotation cap, and that rotation limiting protrusions which move inside of the rotation limiting protrusion are equipped on an inner circumferential surface.

Furthermore, it is featured that on the rotation limiting groove a reverse rotation preventing protrusion is equipped in order to prevent the rotation cap from being rotated into the other direction.

Furthermore, it is featured that the reverse rotation preventing protrusion forms a gentle slope on one side and forms a vertical slope on the other side.

Furthermore, it is featured that a vertical guide groove is equipped longitudinally on both sides of an inner circumferential surface of the pressurizing member, and on both sides of an outer circumferential surface of the pump combining tube is equipped a vertical guide protrusion which is coupled to the vertical guide groove and guides a vertical movement of the pressurizing member.

According to the present disclosure as described on the above, the presently described embodiments have an advantage in that a sealing member moves downward with the rotating operation of a rotation cap, and second contents kept in a storage chamber mixes with a kept in a main container body, so that by simple manipulation, it is possible to make the first and the second contents mixed, and thereby to provide a user with user convenience.

BRIEF DESCRIPTION OF THE DRAWINGS

FIG. 1 is a exploded perspective view illustrating a configuration of dual content mixing container according to an exemplary embodiment.

FIG. 2 is an assembled perspective view illustrating a configuration of dual content mixing container according to an exemplary embodiment.

FIG. 3 is cross-sectional views illustrating a configuration of dual content mixing container according to an exemplary embodiment.

FIG. 4 is an explanatory view illustrating a combination of a pump support body and a pressurizing member of a dual content mixing container according to an exemplary embodiment.

FIG. 5 is an explanatory view illustrating a configuration of a sloped portion of an inner cap of a dual content mixing container according to an exemplary embodiment.

FIG. 6 is an explanatory view illustrating a configuration wherein a descending guide protrusion of a pressurizing member of a dual content mixing container descends along the sloped portion of the inner cap according to an exemplary embodiment.

FIG. 7 is an explanatory view illustrating a configuration wherein a rotation limiting groove of a rotation cap of a dual content mixing container moves inside a rotation limiting groove of an inner cap according to an exemplary embodiment.

FIG. 8 and FIG. 9 are explanatory views illustrating a mixing process of first and second contents in a dual content mixing container according to an exemplary embodiment.

DETAILED DESCRIPTION

Hereinafter, exemplary embodiments will be described in detail with reference to the accompanying drawings. The same reference numerals provided in the drawings indicate the same members.

FIG. 1 is an exploded perspective view illustrating a configuration of a dual content mixing container according to an exemplary embodiment of the present disclosure. FIG. 2 is an assembled perspective view illustrating a configuration of a dual content mixing container according to an exemplary embodiment of the present disclosure. FIG. 3 is cross-sectional views illustrating a configuration of a dual content mixing container according to an exemplary embodiment of the present disclosure.

FIG. 4 is an explanatory view illustrating a combination of a pump support body and a pressurizing member of a dual content mixing container according to an exemplary embodiment of the present disclosure. FIG. 5 is an explanatory view illustrating a configuration of a sloped portion of an inner cap of a dual content mixing container according to an exemplary embodiment of the present disclosure.

FIG. 6 is an explanatory view illustrating a configuration wherein a descending guide protrusion of a pressurizing member of a dual content mixing container descends along a sloped portion of an inner cap according to an exemplary embodiment of the present disclosure. FIG. 7 is an explanatory view illustrating a configuration wherein a rotation limiting groove of a rotation cap of a dual content mixing container moves inside a rotation limiting groove of an inner cap according to an exemplary embodiment of the present disclosure.

Referring to FIGS. 1 to 7, a dual content mixing container according to an exemplary embodiment of the present disclosure includes a main container body 100, an inner cap 200, a rotation cap 300, a sealing member 400, a pump support body 500, a pressurizing member 600, a pumping member 700, and a button member 800.

The main container body 100 keeps a first content substance and in the main container body comprises a piston 110 which ascends according to use of contents.

The inner 200, encircling and combined to the main container body 100, forms a hollow so that a pump combining tube 510 of the pump support body 500 can be combined.

Regarding to the present disclosure, inside the inner cap 200 is equipped a storage chamber 210 which forms a space where second contents, either powder or liquid, is kept, wherein the storage chamber 210 has an open end for the second contents to be filled, and after the second contents is filled, the open end is configured to be closed by the sealing member 600, so as to prevent the second contents filled in the storage chamber 210 from flowing back into the main container body 100.

The second contents stored in the storage chamber 210, when the sealing member 600 descends and thereby the open end of the storage chamber 210 is separated from the sealing member 600, drop into the main container body 100 and mixes with the first content substance.

Meanwhile, it is featured that a pair of sloped portions corresponding to each other are formed protrusively, encircling an inner circumferential surface, wherein the lower end of the sloped portion 220 pressurizes a descending guide protrusion 610 of a pressurizing 600 and guides the pressurizing member 600 to move downwards.

Meanwhile, on an outer circumferential surface of the inner cap 200 are formed a pair of a rotation limiting grooves 230 opposing to each other, in order to limit the rotation range of a rotation cap 300, wherein on a fore-end of the rotation limiting grooves 230 is formed a latching protrusion 231.

It is preferred that a reverse rotation preventing protrusion 232 has a gentle slope on one side so that a rotation limiting protrusion 312 can slide over, whereas the other side has a vertical surface so that a reverse rotation preventing protrusion 312 cannot slide over.

The rotation cap 300 which, encircling the inner cap 200, is combined to be rotated on a upper portion of the main container body 100, comprises a body 310 which a user can grip with a hand in the middle to rotate the rotation cap 300 and a button insertion part 320 which is extended from a upper central part of the body 310 to the upward direction for a button member 800 to be inserted.

It is preferred that a coupling protrusion 311, which is coupled to a coupling groove 521 of the pump support body 500, is formed on an inner circumferential surface so that when the rotation cap 300 rotates, a pump support 500 rotates together.

Regarding to the present disclosure, it is featured that on an inner circumferential of the body 310, a rotation limiting protrusion 312 moving inside a rotation limiting groove 230 is formed, wherein the rotation limiting protrusion 312, as shown in FIG. 7, is placed, being supported by a latching protrusion 231 located on an end of the rotation limiting groove 230, and moves along the rotation limiting groove 230, thereby supported by a reverse rotation preventing protrusion 232.

It is preferred that the rotation limiting protrusion 312 is formed opposing to the other side of the vertical surface of the reverse rotation preventing protrusion 232, in order to prevent reverse rotation of the rotation cap 300 in a state of being supported to the reverse rotation preventing protrusion 232.

Meanwhile, it is preferred that a rotation display part displaying a rotating direction is formed on an outer circumferential surface of the body 310.

Meanwhile, it is preferred that an outer cap 900 is combined on upper portion of the rotation cap 300 so as to prevent a button member 800 from malfunctioning and to block foreign substances inflowing.

The sealing member 400 closes an opened lower end of the storage chamber 210, comprising a sealing tube 410 which closes an end of an inner circumferential surface of the storage chamber 210 and a sealing tube 410 which is extended to upper direction on most of central area of the sealing tube 410 and combined with fit with the pressuring member 600.

Regarding to the present disclosure, it is featured that the sealing member 400 is composed to descend by pressurization of a pressurizing member 600 which descends by rotation of the inner cap 200 when the rotation cap 300 rotates, wherein, when the pressurizing member 600 descends, the sealing member 400 is pressurized by a protrusion 630 of the pressurizing member 600 and descends; hence, a sealing tube 410 is separated from an opened lower end of the storage chamber 210, so that second contents kept in a storage chamber 210 free-falls, thereby enabling a first content substance and second contents to be mixed.

The pump support body 500 is composed to be interlocked inside of the rotation cap 300 with an inner surface of the rotation cap 300, and rotates according to rotation of the rotation cap 300, comprising a pump combining tube 510 to which a pumping member 700 is combined and a securing plate 520 which, encircling the pump combining tube 510, is secured on a upper portion of the inner cap 200.

Regarding to the present disclosure, a coupling groove 521, with a coupling protrusion 311 of the rotation cap 300 coupled, is equipped on an outer circumferential surface of the pump support body 500, and is composed to be rotated along with rotation of the rotation cap 300 while interlocked with the rotation cap 300 through combination with the coupling protrusion 311.

Meanwhile, on both sides of an outer circumferential surfaces of the pump combining tube 510 is equipped a vertical guide protrusion 511 which is combined with the vertical guide groove 620 of the pressurizing member 600 and guides vertical movements of the pressurizing member 600.

The pressurizing member 600 is combined with upper portion of the sealing member 400, descends by rotation of the rotation cap 300, and moves the sealing member 400 to downward direction; regarding to the present disclosure, it is featured that on both sides of the pressurizing member 600 are equipped a pair of descending guide protrusions 610 which respectively meet lower ends of a pair of sloped portions 220.

The descending guide protrusion 610, shown in FIG. 6, when the pressurizing member 600 rotates, is composed to move downwards along the lower end surface of the sloped portion 220, and then moves from a top dead center to a bottom dead center of the sloped portion 220 by rotation, thereby guiding the pressurizing member 600 to move to downward direction.

Meanwhile, the pressurizing member 600 comprises a vertical guide groove 620 to which a vertical guide protrusion 511 is coupled longitudinally on both sides of inner circumferential surfaces in order to interlock with the pump support body 500.

The pump member 700 is combined with a pumping combining tube 510 of the pump support body 500 and discharges contents by pumping operation in accordance with pressurization of the button member 800. Regarding to the present disclosure, the pumping member 700 is a disclosed art; therefore, detailed explanation will be omitted.

The button member 800 is combined to upper portion of the pumping member 700 and operates the pumping member 700, wherein a discharging hole 810 is equipped on one side surface to be able to discharge contents which moves to upper portion through pumping action of the pumping member 700.

Hereinafter, mixing procedure of first and second contents by operation of a dual content mixing container according to exemplary embodiment of the present disclosure will be described in detail.

First, when a rotation cap 300 is rotated to one side direction in a state wherein a user grips a body 310 of a rotation cap 300, rotation of a pump support body 500 interlocked with the rotation cap 300 occurs and thereby a pressurizing member 600 interlocked with a pump support body rotates together.

As the above, when the rotation of a pressurizing member 600 occurs, a descending guide protrusion 610 of the pressurizing member 600 rotates, when the descending guide protrusion 610 moves along a lower end of a sloped portion of an inner cap and moves from a top dead center to a bottom dead center; thereby, the pressurizing member 600 rotate together.

As the above, when the pressurizing member 600 descends, a protrusion 630 of the pressurizing member 600 pressurizes upper portion of a combining tube 420 and thereby causes a sealing member 400 to descend; as a result, a sealing tube 410 which closes an open end of a storage chamber 210 is separated from lower end of the storage chamber 210 and opens a lower end of the storage chamber 210, thereby leading second contents kept in the storage chamber 210 to drop into the main container body 100 and to be mixed with a first content substance.

As described above, optimal embodiments have been disclosed in the drawings and the specification. Although specific terms have been used herein, these are only intended to describe the presently disclosed embodiments and are not intended to limit the meanings of the terms or to restrict the scope of the presently described embodiments as recited in the accompanying claims. Therefore, those skilled in the art will appreciate that various modifications and other equivalent embodiments are possible from the above embodiments. Therefore, the scope of the present disclosure should be defined by the technical spirit of the accompanying claims.

What is claimed is:

1. A dual content mixing container comprising:
a main container body storing first contents;
an inner cap encircling an upper portion of the main container body and fixed to the main container body, the inner cap comprising a storage chamber having a space for storing second contents, and a pair of sloped portions that protrude opposite each other at an inner circumferential surface of the inner cap;
a rotation cap encircling the inner cap on an upper portion of the container body and coupled to be able to be rotated;
a sealing member closing a lower end of the storage chamber of the inner cap and configured to descend when the rotation cap is rotated;
a pump support body interlocked with an inner surface of the rotation cap inside the rotation cap and configured to rotate when the rotation cap is rotated, the pump supporting body further comprising a pump combining tube combined with a pumping member, and a securing plate encircling the pump combining tube and secured on an upper end of the inner cap;
a pressurizing member combined with an upper portion of the sealing member and configured to rotate together with the pump support body while interlocked, the pressurizing member comprising a pair of descending guide protrusions which respectively contact a lower end of the pair of sloped portions, such that the descending guide protrusions thereby rotate with the rotation cap when the rotation cap is rotated and move from a top dead point to a bottom dead point along a lower end of the sloped portions, respectively, causing the sealing member to descend;
the pumping member combined with the pump support body and configured to discharge contents by a pumping operation; and
a button member combined with an upper portion of the pumping member and configured to operate the pumping member, the button member comprising a discharging hole for discharging contents;
wherein a pair of rotation limiting grooves opposing each other are formed at an outer circumferential surface of the inner cap to limit a rotation range of the rotation cap, and a pair of rotation limiting protrusions are formed at an inner circumferential surface of the rotation cap, the pair of rotation limiting protrusions movable inside the pair of rotation limiting grooves, respectively,
wherein a reverse rotation preventing protrusion is formed at each of the pair of rotation limiting grooves for preventing the rotation cap from being rotated in a first direction while being rotated in a second direction opposite the first direction,
wherein a vertical guide groove is formed longitudinally at both sides of an inner circumferential surface of the pressurizing member, and
wherein a vertical guide protrusion is formed at both sides of an outer circumferential surface of the pump combining tube, the vertical guide protrusions coupled to the vertical guide grooves, respectively, so as to guide a vertical movement of the pressurizing member.

* * * * *